(12) United States Patent
Pisani

(10) Patent No.: US 7,401,042 B1
(45) Date of Patent: Jul. 15, 2008

(54) METHOD FOR PROFILING OPTIONS

(76) Inventor: Robert Pisani, 300 El Teyonal, Orianda, CA (US) 94563

( * ) Notice: Subject to any disclaimer, the term of this patent is extended or adjusted under 35 U.S.C. 154(b) by 1295 days.

(21) Appl. No.: 10/096,412

(22) Filed: Mar. 12, 2002

Related U.S. Application Data

(60) Provisional application No. 60/274,947, filed on Mar. 12, 2001.

(51) Int. Cl.
*G06Q 40/00* (2006.01)
(52) U.S. Cl. .................... 705/36; 705/36 R; 705/35
(58) Field of Classification Search .................. 705/36, 705/35, 37, 40
See application file for complete search history.

(56) References Cited

U.S. PATENT DOCUMENTS

| | | | | |
|---|---|---|---|---|
| 5,557,517 | A | * | 9/1996 | Daughterty, III ............. 705/37 |
| 5,940,810 | A | * | 8/1999 | Traub et al. ................ 705/36 R |
| 6,173,276 | B1 | * | 1/2001 | Kant et al. ..................... 706/50 |
| 6,546,375 | B1 | * | 4/2003 | Pang et al. ..................... 705/37 |
| 2003/0101123 | A1 | * | 5/2003 | Alvarado et al. .............. 705/36 |

OTHER PUBLICATIONS

Exhibit "A" (2 pages) and Exhibit "D" (1 page): from Way Back Machine printed on "Oct. 5, 2007".*
Exhibit "B" (3 pages) and Exhibit "C" (2 pages) and Exhibit "E" (2 pages) and Exhibit "E1" (2 pages) and Exhibit "E5" (3 pages) and Exhibit "E51" (2 pages): from Investopedia.com printed on "Oct. 5, 2007".*
Whaley, "Derivatives on Market Volatility: Hedging Tools Long Overdue", Journal of Derivatives, Fall 1993, No. 9944, pp. 71-84.

* cited by examiner

*Primary Examiner*—James P. Trammell
*Assistant Examiner*—Sanjeev Malhotra
(74) *Attorney, Agent, or Firm*—Lieberman & Brandsdorfer, LLC

(57) ABSTRACT

A method for measuring a price level of an option contract or a series of options contracts based upon a volatility of an underlying security. The method includes the process of calculating a rate of return index for an option series. The rate of return index includes factors such as the implied rate of return, the price of the underlying security, and a weighting factor. The rate of return index may be used for a series of call option contracts and a series of put option contracts. Both the series of call option contracts and series of put option contracts may be numerically set to provide an implied interest rate at a specific volatility.

16 Claims, 5 Drawing Sheets

Market Price

Volatility (V)

METHOD FOR PROFILING OPTIONS

CROSS REFERENCE TO RELATED APPLICATION(S)

This is a non-provisional utility patent application claiming benefit of the filing date of U.S. provisional application Ser. No. 60/274,947 filed Mar. 12, 2001, and titled IOTA, RIX, CallRIX, PutRIX and RIX Volatility, and is herein incorporated by reference.

BACKGROUND OF THE INVENTION

1. Technical Field

This invention relates to business models for determining returns attainable on a set of options traded on options markets based upon a volatility factor.

2. Description of the Prior Art

An option is a right to buy or sell a specific amount or value of a particular underlying interest at a fixed price through exercising the option before its stated expiration date. In actuality, an option is a contract between two parties, the buyer of the option and the seller of the option. The buyer of an option is also known as its owner or holder, and the seller of an option is also known as its writer or assigned writer if the seller has been assigned an exercise right or obligation. An option which provides the right to buy the underlying interest is called a "call" option, and an option which provides the right to sell the underlying interest is called a "put" option. The buying and selling of call and put options are independent of one another and, irrespective of the type and classification of the option, options contracts give the buyer/owner the right, but not the obligation, to buy or sell an underlying interest.

There are two kinds of options. Physical delivery options and cash-settled options. Physical delivery options provide the option owner with the right to physical delivery of the underlying interest if the option is a call option or the right to make physical delivery of the underlying interest if the option is a put option. Cash-settled options provide the option owner with the right to receive a cash payment based on the difference between the underlying value of the underlying interest at the time of option exercise and the fixed exercise price of the option. A cash-settled call option allows the option owner to receive a payment if the value of the underlying interest at exercise exceeds the fixed exercise price, and a cash-settled put option allows the option owner to receive a payment if the exercise price exceeds the value of the underlying interest. Irrespective of the type and classification of the option, options contracts give the buyer/owner the right, but not the obligation, to buy or sell an underlying security at a fixed price for a specific period of time.

The most commonly known and traded options are options traded on various options exchanges in the United States and throughout the world. Examples of such exchanges are the New York Stock Exchange, American Stock Exchange, Chicago Board Options Exchange, Pacific Stock Exchange, Philadelphia Stock Exchange, and the European Options Exchange in Amsterdam. However, many additional options markets may exist. As a result of the existence of options markets, options contracts have become relatively uniform in standardized terms which allows for easy trading of options on the options markets. However, each U.S. options market publishes its own specifications for options traded on that market which sets out the standardized terms of the options traded on that options market. Options with the same standardized terms are identical and comprise an options "series."

Examples of the standardized terms are such terms as the form and amount of the underlying interest, the expiration date, the exercise price, classification of the option as a call or put and as a physical delivery option or a cash-settled option, the specific terms of any cash-settled option, the style of option, and if there is an automatic exercise provision or adjustment provision to the option. The use of standardized terms increase the likelihood that the options markets will function as a secondary market for the purchase and sale of options contracts. This provides holders and writers of options with a means to close out their option positions by offsetting sales and purchases. By selling an option of the same series as the one bought, an options holder may closeout his position in that option. By buying an option of the same series as the one sold, an option writer may closeout his position in that option as well. Accordingly, standardized terms and the existence of options series increases the ability of investors to trade options and create a market for the buying and selling of options at prices determined by market factors.

Individual options markets determine the availability of options for selected underlying interests. There are four common types of underlying interest for which options are available: equity securities, futures and stock indexes, government debt securities, and foreign currencies. However, one should keep in mind that these are not the only types of underlying interests which may exist.

The writer, or assigned writer, of an option is obligated to perform according to the terms of the options contract. The contract may have terms for selling the underlying interest at the contracted price for a writer of a call option, or purchasing the underlying interest for a writer of a put option. However, these terms will only impact the writer if the options contract is exercised by the holder. The price that a holder of an option pays is called its premium. The premium is a non-refundable payment for the rights contained in the option. The potential loss to the holder of an option can be no greater than the initial premium paid for the option. As such, a holder controls the amount of the assumed risk. Conversely, the seller of an option assumes the risk of being assigned if the contract is exercised. In such a case, depending upon whether or not the option was "covered" (i.e. the writer owned the underlying interest or is short the underlying interest) or uncovered or naked (i.e. the writer does not have a position in the underlying interest), the writer's risk may be substantial. All options of a series expire on a certain date, known as the expiration date. The option contract may be exercised at any time between the date of purchase of the contract and the expiration date of the contract. Accordingly, an option is a contract providing a holder with the right to purchase or sell an underlying interest without an obligation to actually purchase or sell the underlying interest.

Both call options and put options are known as derivative securities. Their value is derived from the value of an underlying interest. The most common type of underlying interest is the equity security. Equity securities include common stock as well as many other forms of equity such as limited partnership interests. Options on equity securities are commonly known as "stock options" since the majority of such options are on an underlying interest of stock in a corporation. Each physical delivery option contract will have a "unit of trading" or "contract size" which will fix the amount of the underlying interest to be delivered upon exercise. Cash-settled options have a contract size determined by a multilayer which determines the aggregate value of each point of the difference between the exercise price of the option and the settlement value of the underlying interest. Options will have a fixed exercise price, also known as the "strike price," at which price the holder has the right to either buy or sell the underlying stock if the option is a physical delivery option or at which price the holder had the right to receive a cash settlement amount if the option is a cash-settlement option.

Writers and holders of options contracts take positions in the options. When a writer sells an option or a holder purchases an option they are said to have taken an "open" position in the option. A writer or holder is said to have "closed" their position when, prior to expiration, the holder has made an offsetting sale of an identical option (i.e. the same series) or a writer has made an offsetting purchase of an identical option. Two other common positions in options trading are spreads and straddles which are two types of combination positions. Combination positions are positions in more than one option at the same time which are not the same series and may be also used as a "hedge" or "spread" or "straddle". A hedge position is when the investor owns or is short the underlying interest and has an opposing position in options on that underlying interest; that is, long the underlying interest and short call options or long put options on that interest, or short the underlying interest and long calls or short puts on that interest. A spread position is when the investor is both the holder and writer of the same type of option in the same underlying interest with the options having different exercise prices and/or expiration dates. A straddle position is when the investor either holds or writes both a put and call option on the same underlying interest, with the same exercise price and expiration date.

Various methods are known for calculating a fair price for options. One common method for calculating a fair price for options is known as the "Black Scholes" model. A common saying in the investment community is "Buy low and sell high". This logic is applied equally to the options trading markets, as options traders commonly attempt to purchase options for less than the fair value calculated by the investor's Black Scholes model and to sell options for more than the fair value calculated by their Black Scholes model.

One factor in determining a fair price for an option is volatility of the underlying interest, which is usually computed as a measure of changes in price expressed in percentage terms. The volatility that affects the value of the option and that is used in options models like the Black Scholes model is the volatility of the underlying between the time of the valuation and the expiration of the option. Mathematically, the volatility of the underlying interest over a specific period is usually measured as the annualized standard deviation of daily returns during that specific period. Accordingly, the future volatility is an annualized standard deviation of daily returns during some future period. However, future volatility by its nature cannot be known but only estimated. Various methods of estimating the future volatility are used. The most common is to use the volatility of the underlying interest over a recent time period, and perhaps extrapolating it using a trend analysis. Options prices are themselves used to estimate volatility, by using the "implied volatility", which is that volatility value that "explains" the current market price of an option, meaning that volatility value which, if used in the option model such as Black Scholes, makes the theoretical fair value equal to the market price of the option. Different options series on the same underlying may, and usually do, yield different implied volatilities, so that difference options express different, and therefore inconsistent, market "opinions" about the future volatility of the underlying. Implied volatility of an options series is often used as a measure of the degree of pricing extremity of the options series, and the implied volatilities of different options are compared by investors and traders to determine which series on an underlying are the best "buys" or "writes". Further, the implied volatilities of options on different underlyings are often compared with one another and with the estimates of future volatilities of the underlyings, in order to determine which of the underlyings offer the best opportunities for hedging or spreading. In determining a fair price for an option, it is common to evaluate the relationship between implied volatility and estimated future volatility. Volatility calculations used in options pricing formulas are only estimates of future volatility, but they are critical in determining the value of an option.

The Black Scholes model also provides a conventional method of calculating an implied interest rate. The Black Scholes method of options valuation has two significant suppositions: 1) a riskless hedge could be constructed between an underlying interest and a variable quantity of call options on the underlying interest, with the variable quantity selected continuously so that the behavior of the call option positions imitate the reverse underlying interest position and produce a riskless return, and 2) the rate of return on money invested in the riskless hedge should be equal to the rate of return on any other riskless investment. The Black Scholes equation is DNRR r, where DNRR is the "delta neutral rate of return" on a continuously adjusted hedge and r is the riskless rate of return, often taken to be the T-bill rate for the period of time until expiration of the option. In the case of a call option on a stock that pays no dividends, this equation leads to a formula that allows traders to derive the value of the call option given its strike price and expiration date and the volatility of the underlying between the time of the valuation and the expiration of the call. However, this mathematical formula has two uncertain factors, the future volatility of the underlying interest's price until expiration and the riskless interest rate. The volatility of the underlying interest's price was assumed by Black and Scholes to be known and constant. However, in actuality the future volatility of the underlying interest's price is unknown and difficult to ascertain with precision. In practice, most traders estimate the future volatility by looking at the recent past. If this practice is followed, often options are not priced by the market according to the Black Scholes model.

The only prior art calculation that attempts to measure the general implied volatility level of a collection of calls and puts on a given underlying is the Volatility Index (VIX) which was proposed by Robert Whaley of Duke University in a paper entitled "Derivative on Market Volatility: Hedging Tools Long Overdue" published in the Journal of Derivatives 1 (Fall 1993), 71-84. The broadcasting of VIX was introduced by the Chicago Board of Options Exchange in 1993 on a real time basis. VIX provides a simple measure of the general implied volatility level for the general class of options, both puts and calls, on the OEX index. VIX is created from eight options that are near-the-money and within thirty days of expiration. However, VIX has the following limitations: (1) VIX applies only to options on the OEX index, (2) it considers both calls and puts together and does not distinguish call levels from put levels, (3) it is not a uniquely defined number but is rather a function of the riskless interest rate assumed, (4) it uses a fixed interest rate and does not consider the interest rate to be a measure of return on delta neutral hedging, (5) it cannot be used to derive a unique and unequivocal estimate of future volatility for an arbitrary given time period, and (6) it cannot be used to derive a unique and unequivocal estimate of future volatility for an arbitrary expiration of the options on the underlying. Accordingly, there is a need to have a good estimate of future volatility of the underlying based upon the market prices of the options on the underlying, and the usual inconsistency of implied volatility estimates provided by the different options series on an underlying makes it highly desirable to have a method of estimating volatility from market prices that is consistent with all market prices of options on an underlying interest.

SUMMARY OF THE INVENTION

This invention comprises a method of measuring the price level of options as well as a method for determining a unique volatility consistent with the prices of options in a selected collection of options series. For purposes of clarity, the underlying interest, also known as an underlying instrument, will be referred to as a security or stock interest, which is the most common underlying interest upon which options are written.

In a first aspect of the invention, a price level of options on a given underlying instrument based upon a volatility of the underlying instrument is measured. The method includes measuring a degree of variation of each price of each option series in a collection of market prices of said collection of options series on a single underlying instrument, calculating a theoretical return attainable from delta-neutral hedging a single option series at a market price, and calculating a composite return attainable from delta-neutral hedging of the options in the collection of option series. The step of calculating a theoretical return attainable from delta-neutral hedging a single option series at a market price preferably includes ascertaining a return attainable by using the option series in a delta-neutral hedge given a volatility of the underlying instrument. In addition, a weighting factor may be applied to each said option series. The weighing factor may be an arbitrary value or it may be a function of a partial derivative of a value of an option in the option series with respect to a price of the underlying instrument. In the case of a partial derivative, the partial derivative may be a first derivative or another order of the derivative. The collection of the options series may be a set of call options available from the underlying instrument, a set of put options available for the underlying instrument, a set of call and put options available for the underlying instrument, or any subset of option series available for the underlying interest.

In a second aspect of the invention, a method for determining a unique volatility estimate based upon market prices of a collection of option series is provided. The method includes calculating a composite return attainable from delta-neutral hedging using a call option model, calculating a composite return attainable from delta-neutral hedging using a put option model, and then determining a numerical solution by setting a value under said call option model equal to a value of said put option model. The step of determining a numerical solution provides a single volatility explaining market prices relative to the call and put option models. This single volatility is the market's unique estimate of the volatility of the underlying over a future period of time defined by the collection of options series chosen. The time period defined can be altered by choosing the collection of call and put option series given positive weights in the index. The return from delta-neutral hedging is a measure of profitability of the option models.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1:
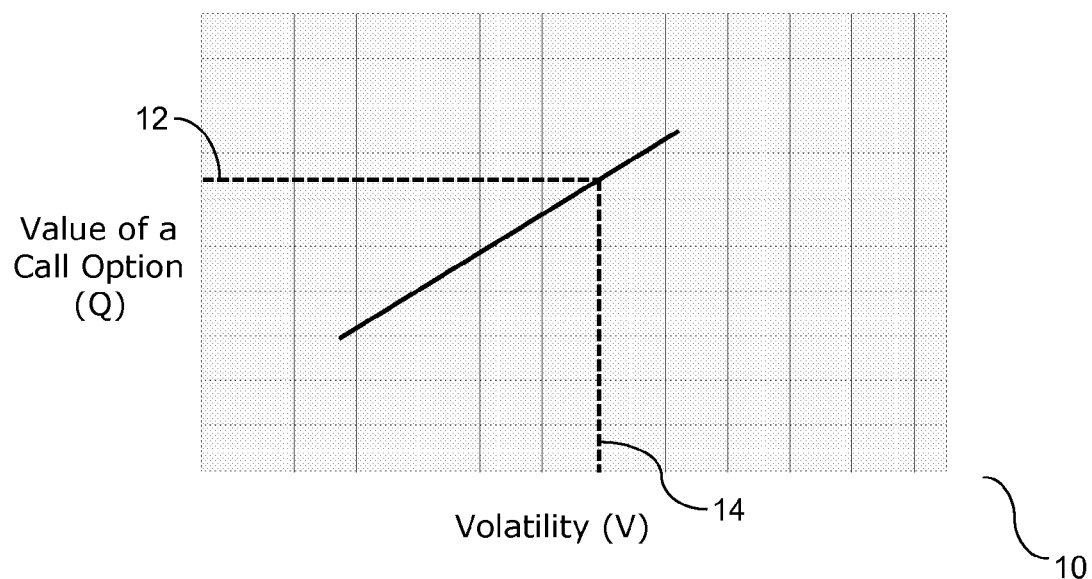
FIG. 1 is a graph of a function of a value of a call option versus the volatility.

Delta is the amount by which an option's value will change for a one-point change in price by the underlying entity according to the option model used. Call options have positive deltas, while put options have negative deltas. A two-option ratio spread is established as a delta neutral position by utilizing the deltas of the options involved. The neutral ratio of options written (i.e. short) to options owned (i.e. long) in a delta neutral position is determined by dividing the delta of the owned options (i.e. the option series held long) by the delta of the written options (i.e. the option series held short).

A hedge or spread is a conservative strategy used to limit investment loss by effecting transactions in which offsetting interests are taken, such as long stock and short calls on the stock, long stock and long puts on the stock, long calls of one strike price and expiration and short calls on the same underlying with either different strike price or expiration, etc. Hedges may be created by utilizing spread and straddle positions with options only, but may also contain a position in the underlying security. Technically, the delta is an instantaneous measure of the option's value change as a fraction of the change in the price of the underlying, so that the delta will be altered for even small changes by the underlying entity and for small passages of time and the subsequent decrease in time to expiration. For example, a delta of 0.4 means that the value change of the option under the model used is the same as the price change in 0.4 of the underlying, which in the case of stock would be the same as 40 shares of the stock. As such, delta describes the currently equivalent position in the underlying. To obtain a hedge of a long position in 100 shares with such an option, one would need 2.5 such options. As options are only traded in integral numbers, a delta neutral hedge would be long 200 shares of the stock and short 5 such options. The hedge ratio of options short to stock long is 2.5 to 1. It is useful in that the delta of an option allows one to construct a theoretically neutral hedge by taking offsetting positions in the underlying stock and the equivalent number of its call options.

Technical Details

The Black Scholes model and other known conventional models for determining the value (Q) for an option has the following parameters: the current price of the underlying security (S), the strike price of the option (K), the time remaining to expiration of the option (T), the riskless interest rate (R), and the future volatility of the underlying (V). In the more complicated situation of stocks paying dividends or experiencing price jumps of another known nature, the jump process (J) describing such situations is also a factor. In all cases, both the future volatility of the underlying (V) and the riskless interest rate (R) are two factors that are not contained in the terms of the option contract. These two factors (V) and (R) and a jump factor (J) must be calculated by the investor or trader. Each option contract has a plurality of factors involved in determining a fair price in the open market under the Black Scholes model. Whether the contract is for a call option or a put option, each option contract will have a strike price (K) and a time period remaining on the contract prior to its expiration (T). Finally, the models for determining the value of an option may apply equally to a type (TYPE) of option contract defined as either a call option or a put option.

The Black Scholes models, as well as other known conventional models for determining a fair price of a securities option, have been converted into mathematical models and associated computer programs. The conversion of the models allows traders to efficiently calculate an estimated fair market values for options contracts. Whether the option model is for a call option contract or a put option contract, the models have several properties that are well defined and satisfy the following Arbitrage Conditions:

(1) Q (S,K,T,R,V,J, TYPE) is monotonic in S, K, T, R, and V for either type of option;

(2) Q (S,K,T,R,V,J, TYPE) is non-negative for either type of option;

(3) Q (S,K,T,R,0,J, Call)=$(S-Ke^{(-r*t)})$ for any fixed values of the other parameters;

(4) Q (S,K,T,R,V,J, Call)→S as V→∞ for any fixed values of the other parameters;

(5) Q (S,K,T,R,V,J, Call)→S as R→∞ for any fixed values of the other parameters;

(6) Q (S,K,T,R,V,J, Call)→0 as R→-∞ for any fixed values of the other parameters;

(7) Q (S,K,T,R,0,J, Put)=$(Ke^{(-r*t)}-S)^+$ for any fixed values of the other parameters;

(8) Q (S,K,T,R,V,J, Put)=$Ke^{(-r*t)}$ as V→∞ for any fixed values of the other parameters;

(9) Q (S,K,T,R,V,J, Put)→0 as R→∞ for any fixed values of the other parameters;

(10) Q (S,K,T,R,V,J, Put)→∞ as R→-∞ for any fixed values of the other parameters;

The Black Scholes model and all public options models satisfy all of the above-listed Arbitrage Conditions. Any model that does not satisfy all of conditions 1-10 listed above is unrealistic in a competitive market as it would allow riskless arbitrage of the options.

The value of the option under the model for a set of option parameters TYPE, S, K, T, R, V and J is known as Q. The value Q of the option is a real number greater than or equal to zero. K and T are values that are determined by the contractual terms of the option and are not disputable or in need of any estimation. S is the current (usually latest) price at any time and is typically known or assumed. There are numerous interest rates R that may be considered riskless, but the standard one is the T-Bill rate for T-Bills with the same number of days to maturity as the option. The volatility of the underlying V is considered constant in most models, but there are models that consider varying volatility. The jump process J describes what happens when a dividend is paid or when another such predictable "shock" to the stock price occurs.

For such a model, the Arbitrage Conditions imply certain elementary characteristics of Q. For instance:

Q is an increasing function of S for calls and a decreasing function of S for puts;

Q is an increasing function of T for all options;

Q is an increasing function of K for puts and a decreasing function of K for calls;

Q is an increasing function of V for all options.

For options contracts that satisfy the above-listed parameters, there are certain elementary characteristics that impact on the value of an option, such as the value of the option is a function of 1) the current price of an underlying security; 2) the strike price of the option; and 3) the volatility for the options markets. The theoretical value of an option is not the market price of an option, although they may be identical values if market participants are only willing to trade the option at the theoretical value. Rather, the theoretical value of an option is a value based upon the values of the above-outlined parameters. The market price is determined by the market itself and the price that buyers and sellers are willing to bid and offer for the option at any given time. Accordingly, an option's theoretical value is dependent upon factors which are not related to the market price of the option, although the value and market price may coincide if the market participants have correctly anticipated the theoretical value of the option.

Future volatility of the underlying is a major factor in determining the value of the option. Future volatility is difficult to ascertain since it is a function of the future behavior of the underlying security. An implied volatility may be ascertained by reviewing a current market price of the option and assuming a riskless interest rate. For a given option model and an assume riskless interest rate, the implied volatility is the volatility value that makes the model price Q equal to the market price of the option. The future volatility of an underlying security is a major factor in determining the value of the option.

An implied volatility can be determined from a variety of tools. This includes using current values of volatility to determine the actual value of the option model. Since the value of the option model is an increasing function of volatility, this method will not provide a value equivalent to the market price, but will provide you with a value "close" to the market price. FIG. 1 is a graph 10 if the value of a call option compared to the corresponding volatility. In this illustration, it is understood that the change in the value of the option with respect to the change in volatility is positive for any fixed interest rate. To find the implied volatility for a given market price for the call option of a given underlying security, a person must find the market price 12 along the vertical axis and ascertain the corresponding horizontal axis value 14 for the implied volatility. This particular graph is drawn using the Black Scholes model for a call on a stock paying no dividends, with the formula:

$$Q = S \times N(h) - K \times e^{-RT} \times N(h - V\sqrt{T}) \quad \text{Equation 1}$$

where S is the stock price, N is the cumulative normal distribution function, K is the strike price of the call, T is the time to expiration, and V is the future volatility of the underlying stock, and h is defined as:

$$h = \frac{\left[\ln\left(\frac{S}{K}\right) + T\left(R + \frac{V^2}{2}\right)\right]}{\left[V\sqrt{T}\right]} \quad \text{Equation 2}$$

FIG. 1 uses fixed values for all the parameters except V, and shows how Q, the value of the call, varies for different values of V. It should be understood that for the Black Scholes and for any other model satisfying elementary non-arbitrage requirements, the implied volatility of a call option is a function of the cost of borrowing money which is related to the rate of interest one would expect to earn on money invested. If a different interest rate is used, the functional relationship between the value of the call option and the future volatility of the underlying will change. Accordingly, the illustration shown in FIG. 1 is merely an illustrative function which may vary according to the assumed interest rate, but according to the model parameters will always be a positive function as the interest rate on lent funds is always assumed to be a positive function.

Figure 2:
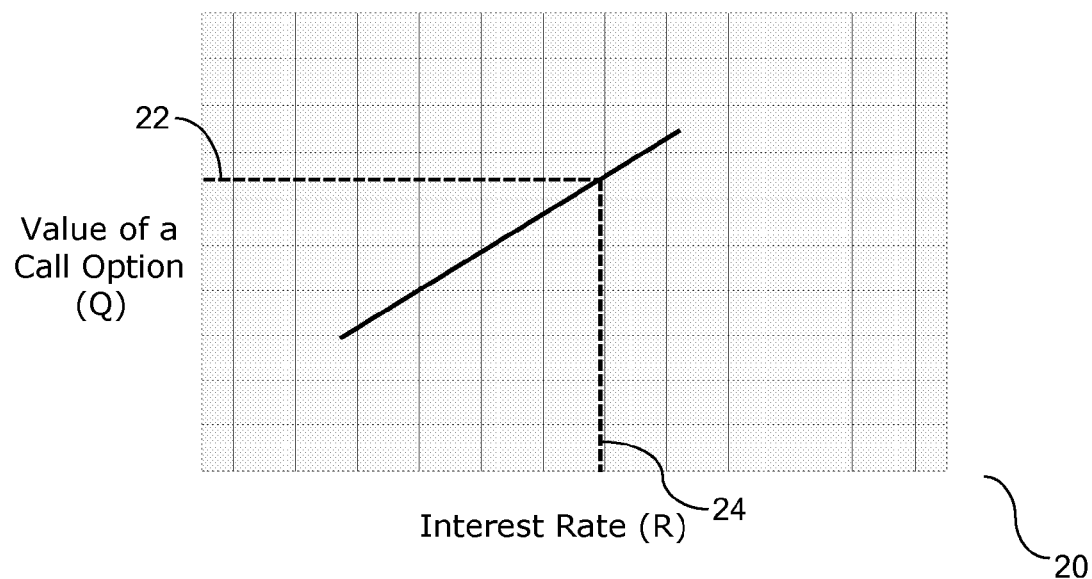
FIG. 2 is a graph of a function of a value of a call option versus the interest rate.

If a person knows the future volatility associated with an underlying, this person can use a similar technique to determine an implied interest rate associated with the call option and the value of the call option. FIG. 2 is a graph 20 of the value of the call option compared to the corresponding interest rate. In this illustration, it is understood that the change in the value of the call option with respect to the change in interest is positive for any fixed volatility. To find the interest rate for a given market price for the option of a given underlying security, a person must find the market price 22 along the vertical axis and ascertain the corresponding horizontal axis value 24 for the interest rate. It should be understood, the interest rate of a call option is the cost of borrowing money. If a different volatility is used, the functional relationship between the value of the call option and the interest rate will change. Accordingly, the illustration shown in FIG. 2 is merely an illustrative function which may vary according to the volatility, if known, and according to the model parameters will always be a positive function.

Figure 3:
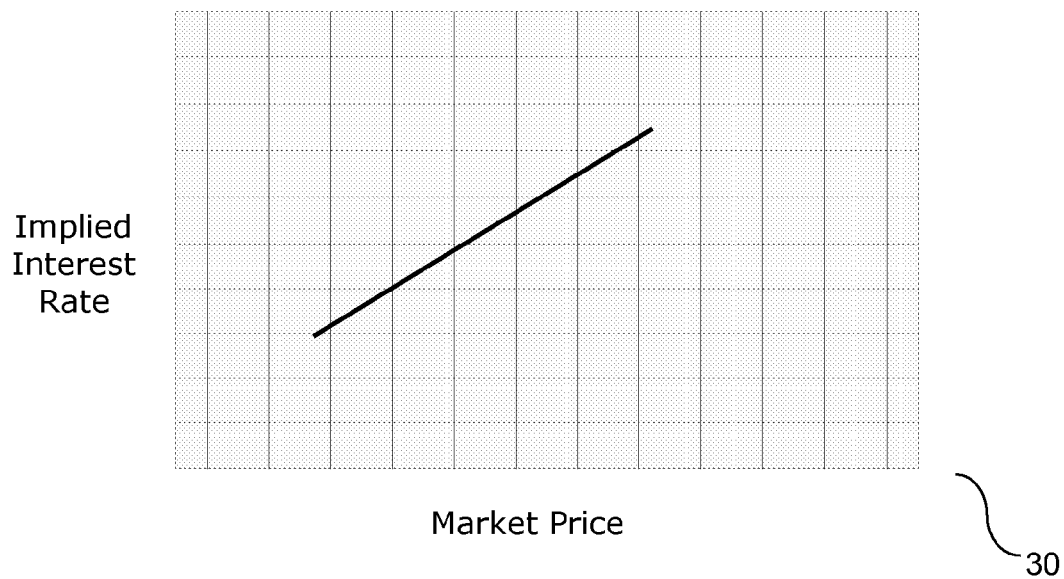
FIG. 3 is a graph of a function of the implied interest rate of a call option versus the market price.
Figure 4:
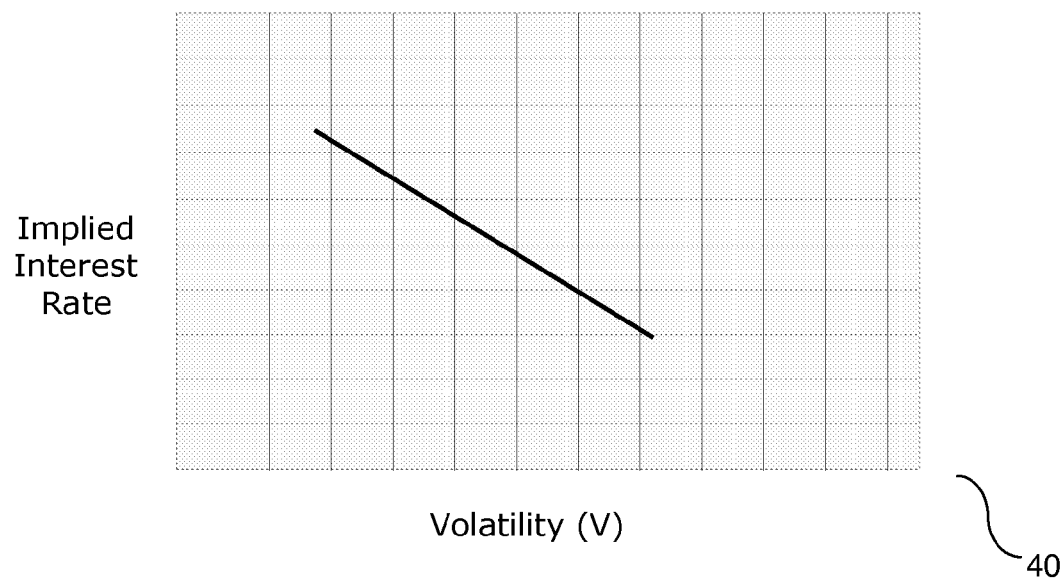
FIG. 4 is a graph of a function of the implied interest rate of a call option versus the volatility.

A different volatility value will give a different function defining the relationship between the value of the call option and the interest rate. The interest rate for a given volatility is also known as an "implied interest rate". The implied interest rate is a function of volatility. By using different values of volatility for a given market price of an option, a different implied interest rate will be obtained. FIG. 3 is a graph 30 of the implied interest rate compared to the price of the option for a call option. Since the value of a call option increases with the interest rate, a higher call market price will correspond to a higher value of the interest rate. Similarly, FIG. 4 is a graph 40 illustrating the implied interest rate compared to the volatility associated with a call option. For a given market price of a call option, a higher volatility corresponds to a lower implied interest rate. As the volatility increases the implied interest rate decreases. In mathematical terms:

$$\frac{dQ}{dR} > 0 \quad \frac{dR}{dV} < 0 \quad \text{Equation 3}$$

Accordingly, the relationship between the implied interest rate and volatility is inverse to the relationship between the value of an option and the implied interest.

Figure 5:
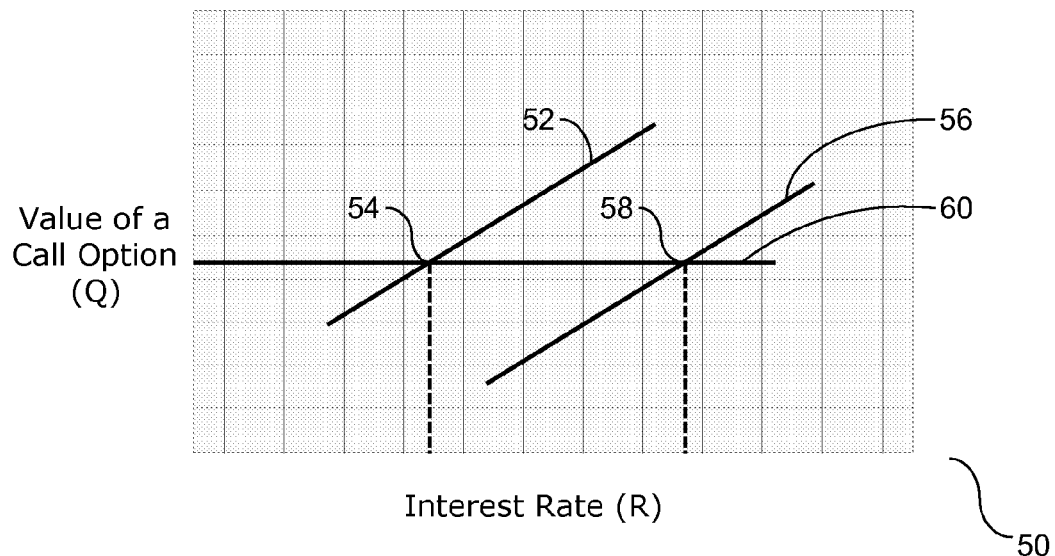
FIG. 5 is a graph of multiple functions of a value of a call option versus the interest rate.

If the volatility of a call option is a fixed value, a higher call market price will correspond to a higher value of the implied interest rate. Similarly, a higher volatility will yield lower values for the implied interest rate at a given volatility for call options, i.e. the implied interest rate declines as the volatility increases. The relationship between the implied interest rate and volatility is the inverse to the relationship between the value of the option and the interest rate. FIG. 5 is a graph 50 illustrating the relationship between the value of a call option and the interest rate for two different values of volatility. Line 52 represents a high volatility, and line 56 represents a low volatility. The horizontal line 60 represents a hypothetical call price for the option. The point 54 where the call price intersects line 52 provides the implied interest rate for the high volatility call option, and the point 58 where the call price intersects line 56 provides the implied interest rate for the low volatility call option. The implied interest rate at a given volatility is the theoretical return attainable by delta-neutral hedging if the option is sold at a given price. If the price of the option changes so does the implied interest rate. Different prices for the option lead to different values for the implied interest rate. Accordingly, the implied interest rate at a given volatility is a direct measure of the profitability of the option.

Figure 6:
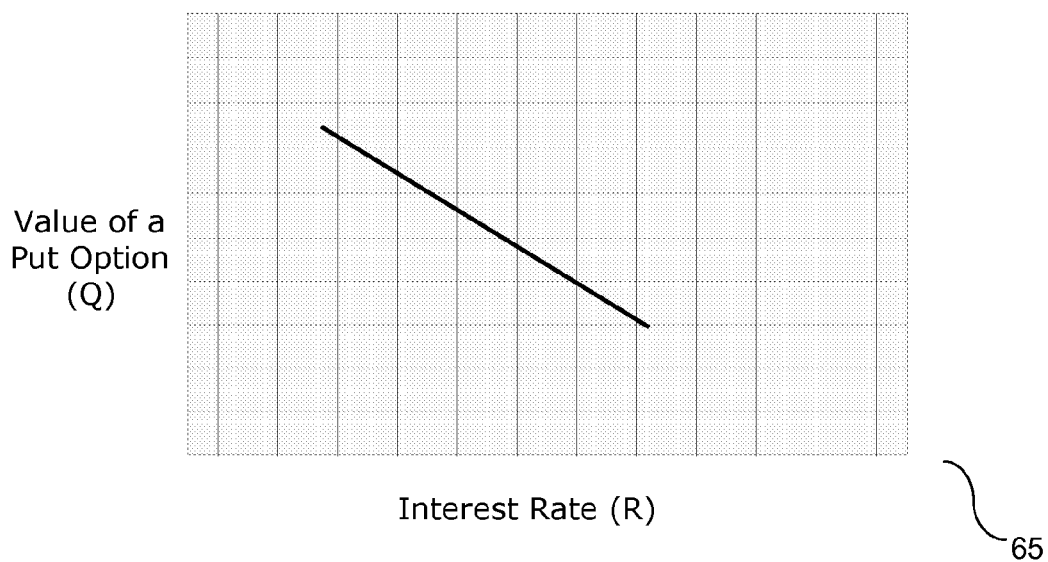
FIG. 6 is a graph of a function of a value of a put option versus the interest rate.

The above discussion relates specifically to call options. However, it can be similarly adapted and applied for put options. FIG. 6 is a graph 65 illustrating the function of the value of a put options as it relates to the interest rate. As the interest rate increases to the right on the horizontal axis, the value of the put option decreases; and as the value of the put decreases, the interest rate associated with the put option increases. Therefore, the implied interest rate for put options behaves in this regard opposite to the way it behaves with call options. The higher the volatility of a put options, the greater the return that can be attained by hedging the put option in the delta-neutral manner.

From the above description of the implied interest rate, the volatility and the value of a call option can be extrapolated to a group of collection of option series. For a group of call option series on a single underlying security there is a composite implied interest rate for any assumed volatility of the underlying instrument. The implied interest rate on a group of option series can be utilized to calculate a return index on a set of options as a measurement of the degree of overpricing or underpricing of an option series of a group of option series. This is beneficial in determining a position on a set of option series of an underlying security as well as determining a delta neutral hedge position. The return index described herein takes a group of option series of an underlying security to measure the composite return available from hedging the options. Accordingly, the return index represents the composite overpricing or underpricing level of the group of option series that are used in the computation.

One of the components in calculating the return index of a group of options is the measurement of the delta neutral rate of return ("DNRR") of an option. The DNRR is indicative of whether an option is overpriced or underpriced at a given or assumed volatility of the underlying. The DNRR is a function of the volatility of the underlying security. In the return index, the DNRR is computed as an annualized rate of return. Multiplying the DNRR by a given price results in a dollar return value on an annualized basis. For a given volatility, the DNRR is the interest rate that is implied by the market price of the option.

A second factor in calculating the return index of a group of options is applying a weighting factor to the calculation. The weighting factor may take into account the current or recent volume of trading for a particular option series, i.e. the number of options contracts traded in a given period; it may take into account the total number of contracts "open" in the series; it may take into account the expirations of interest; it may take into account the nearness to profitability ("in-the-money") of the options series; and other relevant factors. The weighting factor may be an arbitrary number, a static value, or a function of a partial derivative of a value of an option in an option series with respect to a price of an underlying security. The partial derivative may be a first derivative, a second derivative or another order of derivative available.

Both the DNRR and the weighting factor are components that are used to calculate a composite return attainable from delta-neutral hedging a collection of options series.

$$\frac{\sum_i \left[ \frac{((DNRR) \times (price_i))}{\frac{\partial Q_i}{\partial S}} \times W_i I_i \right]}{\sum_i \left[ \frac{price_i}{\frac{\partial Q_i}{\partial S}} \times W_i I_i \right]} \qquad \text{Equation 4}$$

Equation 4 defines the composite rate of return index where the variables herein have the following definitions: Q is the value of an option, S is the price of an underlying security, W is a weighting factor, and $I_i$ is an indicator function. The summation is based upon the collection of the option series. The subscript i indexes the options series in the calculation. In the preferred embodiment, the indicator function $I_i$ is equal to 1 for options with index "i" that are Near Options, and equal to 0 for all other options. An option (option series) is a Near Option if it is Near in Time and Near in Price, i.e. the strike price is near to the current price of the underlying. Near in Time is defined as the time to expiration is at least n days or time units in the future, but at most m days or time units in the future. For example, the Chicago Board Options Exchange calculation of VIX is based upon options for which n=8 and m=the number of days to the second expiration following the first expiration that is at least eight days away. Therefore, Near in Time is defined to be at least 8 days and at most the number of days remaining until the following expiration, so that two adjacent expirations are used, the first of which is at least eight days in the future. Near in Price is defined as the z-score of the strike price is either at most x, where x is a positive number, or at least y, where y is a negative number. The z-score is computed using the standard deviation rate of return for the underlying over the time remaining to expiration of the option. For example, the Chicago Board Options Exchange calculation of VIX is based upon options for which x=y=0. There may be no options that are exactly at-the-money, so their algorithm effectively creates a synthetic series by interpolating the implied volatilities of Near Options, and then uses the implied volatilities of their strikes and expirations to create a composite implied volatility, which is VIX. However this patent is not limited to this preferred embodiment definition of a Near Option and shall apply to any selection of indicator values $I_i$. The composite rate of return can be calculated based upon a set of call options available for an underlying security, a set of put options available for the underlying security, or a combination of a set of call and put options available for the underlying security. Accordingly, the composite rate of return may include any subset of options available for an underlying security, as well as an array of Indicator values that are preferably Near in Time or Near in Price.

Figure 7:
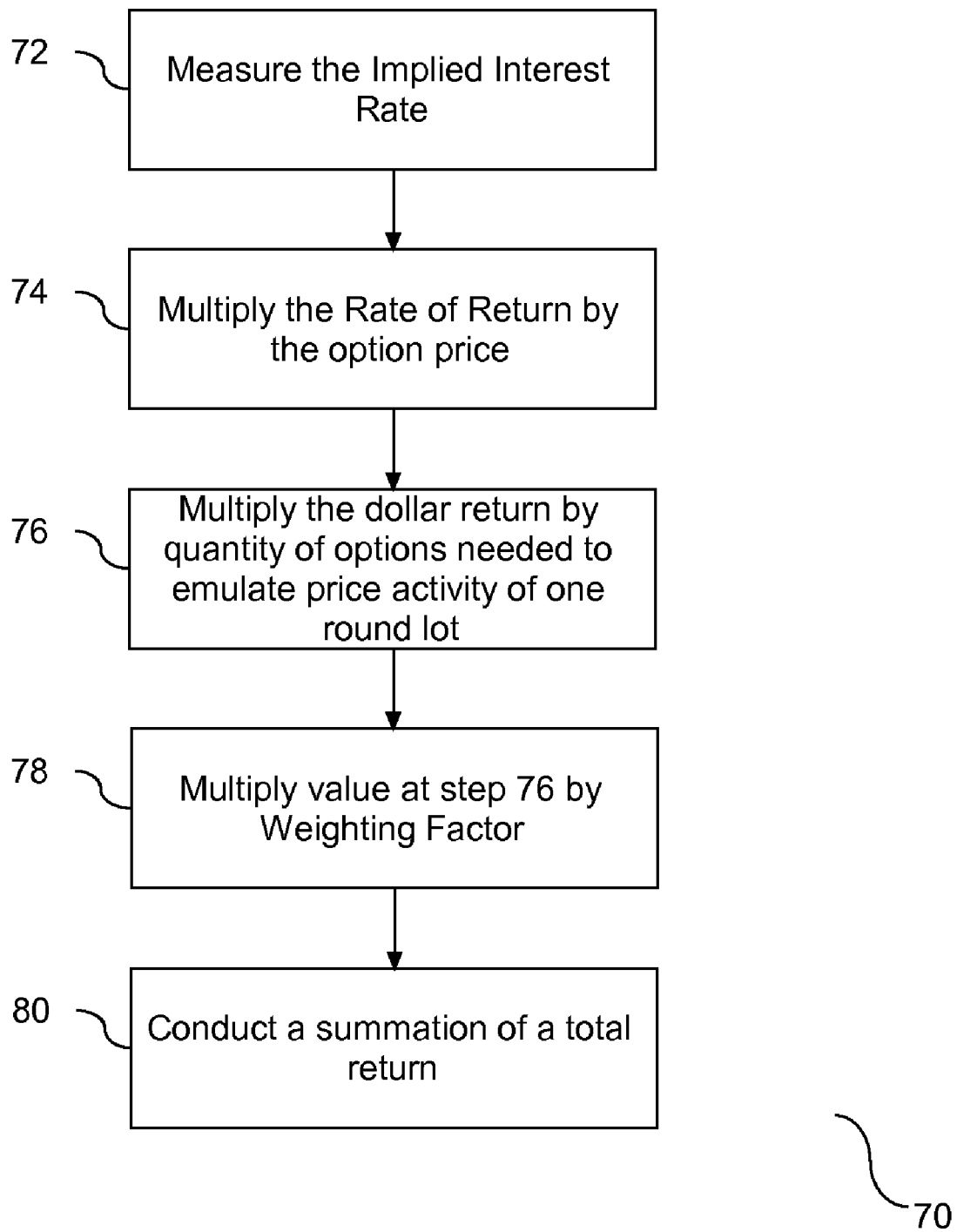
FIG. 7 is a flow chart outlined the steps of calculating the rate of return index according to the preferred embodiment of this invention, and is suggested for printing on the first page of the issued patent.

FIG. 7 is a flow chart 70 outlining the steps of calculating a composite rate of return available for a grouping of option series available for an underlying security. The first step 72 in computing the composite rate of return available for a series of options is to measure the implied interest rate for a given volatility for each option series. The implied interest rate is the rate of return theoretically available for option series in the group. Following the computation of the rate of return, the rate of return is multiplied by the option price to obtain a currency value return theoretically available from the option 74. Thereafter, the currency return is multiplied by the quantity of options needed to emulate the price activity of one round lot 76. Step 76 provides a round lot equivalent so that each option's return is measured on the same basis. The value obtained at 76 is then multiplied by a weighting factor 78 as discussed above. A summation of the total currency return from each option is then conducted 80. The summation at step 80 may then be divided by the investment total. The steps outlined in FIG. 7 can be applied to any set of option series, including call and put options or any combination thereof. Accordingly, the computation of the composite return provides a profile of options of a given underlying security based upon the volatility of the underlying security.

One important factor in determining pricing of an option series is to measure the degree of overpricing or underpricing of an option series or of a group of option series. The rate of return index takes a collection of an option series and measures the composite average return available from hedging the options in the group. In obtaining a delta-neutral hedge, a trader will adjust the hedge position once the net delta of the position changes from zero. This will occur when the price of the underlying security moves dramatically in any direction or when the time to expiration changes. In general, only these two parameters change regularly over the course of time and affect the changes in the theoretical value of the option. Traders generally calculate the quantity of call options they must purchase or sell to remain delta neutral or as close to delta neutral as is possible.

Figure 8:
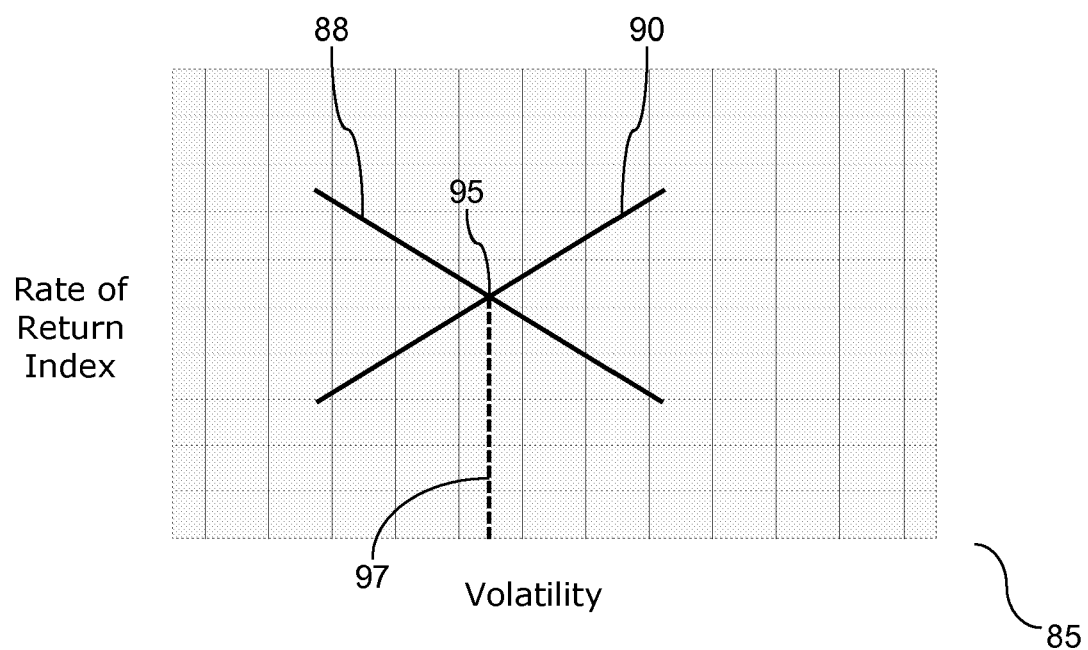
FIG. 8 is a graph of a rate of return index for a series of call options and a series of put options versus the volatility.

The rate of return index may be applied to both call options and put options, either combined or separately. The rate of return index for a group of option series is a function in relation to the volatility of the option series. The function is a decreasing function for call options and an increasing function for put options. FIG. 8 is a graph 85 illustrating the relationship between the return index for two separate options groups on a given underlying, one relationship for calls and the other for puts. Line 88 represents the function of the return index for a set of call options and line 90 represents the function of the return index for a set of put options. The point 95 at which these two functions intersect provides the unique volatility 97 that yields the same return for the collection of calls on the underlying security and for the collection of puts on the underlying security. Accordingly, the point 95 is the estimate of future volatility of the underlying security derived from the composite pricing of the call options and put options on the underlying security with non-zero indicator functions $I_i$.

Advantages Over The Prior Art

The conventional models used in determining volatility associated with an options contract and a series of options contracts generally calculate volatility based upon historic, current and future volatility. In addition, the Market Volatility Index of the Chicago Board of Option Exchange has become a popular measurement for volatility. The preferred embodiments disclosed herein include calculating a rate of return index based upon additional factors than those used in conventional models or the Market Volatility Index. The rate of return index disclosed herein takes a collection of an option series and measures the composite average return available from hedging the options in the group of those options with non-zero indicator functions $I_i$. The rate of return index may include call options and put option separately or combined. Accordingly, the rate of return index is a realistic index for any grouping of options.

Alternative Embodiments

It will be appreciated that, although specific embodiments of the invention have been described herein for purposes of illustration, various modifications may be made without departing from the spirit and scope of the invention. In particular, the underlying interest of the options contract may be in the form of equity securities, stock indexes, government debt securities, and foreign currencies as well as commodities. In effect, the invention may be applied to any scenario in which options are available for an underlying investment product. Accordingly, the scope of protection of this invention is limited only by the following claims and their equivalents.

I claim:

1. A method for measuring a price level of options on a given underlying security based upon a volatility of said underlying security instrument comprising:
   measuring variation of price of each option series in a collection of market prices of a collection of option series on a single security
   calculating a theoretical return on said option series attainable from delta-neutral hedging said option series at a market price;
   calculating a composite return attainable from said calculated theoretical returns of said options in said collection of option series, including returning a rate of return of said option series; and
   calculating a unique volatility estimate based upon the calculated composite return derived from market prices of a collection of options series, comprising: charting volatility on a vertical axis of a graph; charting interest rate on a horizontal axis of a graph;
   representing a function of a set of call options on said graph, wherein said function of the set of call options is a declining function;
   representing a function of a set of put options on said graph, wherein said function of the set of put options is a declining function; and
   calculating a unique volatility value as an intersectional point the point of intersection of said functions of the set of call options and the set of put options.

2. The method of claim 1, further comprising the step of applying a separate weighting factor to each of said option series in said collection of option series.

3. The method of claim 2, wherein said weighting factor of said option series is a function of a partial derivative of a value of an option in said option series with respect to a price of said underlying instrument.

4. The method of claim 3, wherein said partial derivative is a first derivative.

5. The method of claim 1, wherein said collection of said option series is a set of call options available for said underlying instrument.

6. The method of claim 1, wherein said collection of said option series is a set of put options available for said underlying instrument.

7. The method of claim 1, wherein said collection of said option series is a set of call option series and a set of put option series available for said underlying instrument.

8. The method of claim 1, wherein said collection of said option series is any subset of said option series available for said underlying instrument.

9. The method of claim 1, wherein the step of calculating a theoretical return attainable from delta-neutral hedging a single option series at a market price includes ascertaining a return attainable by using said option series in a delta-neutral hedge given a volatility of said underlying instrument.

10. The method of claim 1, wherein said unique volatility is a value of said intersectional point of intersection on said vertical axis of said graph.

11. The method of claim 1, further comprising applying a weighting factor to said options, wherein said weighting is a partial derivative of a value of an option in an option series with respect to a price of an underlying security instrument.

12. A method for determining a unique volatility estimate based upon market prices of a collection of options series, comprising:
   calculating a composite return attainable from delta-neutral hedging using a call option model;
   calculating a composite return attainable from delta-neutral hedging using a put option model; and
   determining a numerical solution for a unique volatility estimate by setting a value under said call option model equal to a value of said put option model, including:
      charting volatility on a vertical axis of a graph;
      charting interest rate on a horizontal axis of a graph;
      representing a function of a set of call options on said graph, wherein said function of the set of call options is a declining function;
      representing a function of a set of put options on said graph, wherein said function of the set of put options is a declining function; and
      calculating a unique volatility value as an intersectional point the point of intersection of said functions of the set of call options and the set of put options.

13. The method of claim 12, wherein the step of determining a numerical solution by setting a value under said call option model equal to a value under said put option model provides a single volatility explaining market prices relative to said call and put option models.

14. The method of claim 13, wherein said return from delta-neutral hedging is a measure of profitability of said option models.

15. The method of claim 12, wherein said call option model is a function of a calculation of a composite return attainable from delta-neutral hedging call options in a collection of a call option series.

16. The method of claim 12, wherein said put option model is a function of a calculation of a composite return attainable from delta-neutral hedging put options in a collection of put option series.

* * * * *